United States Patent Office 3,365,348
Patented Jan. 23, 1968

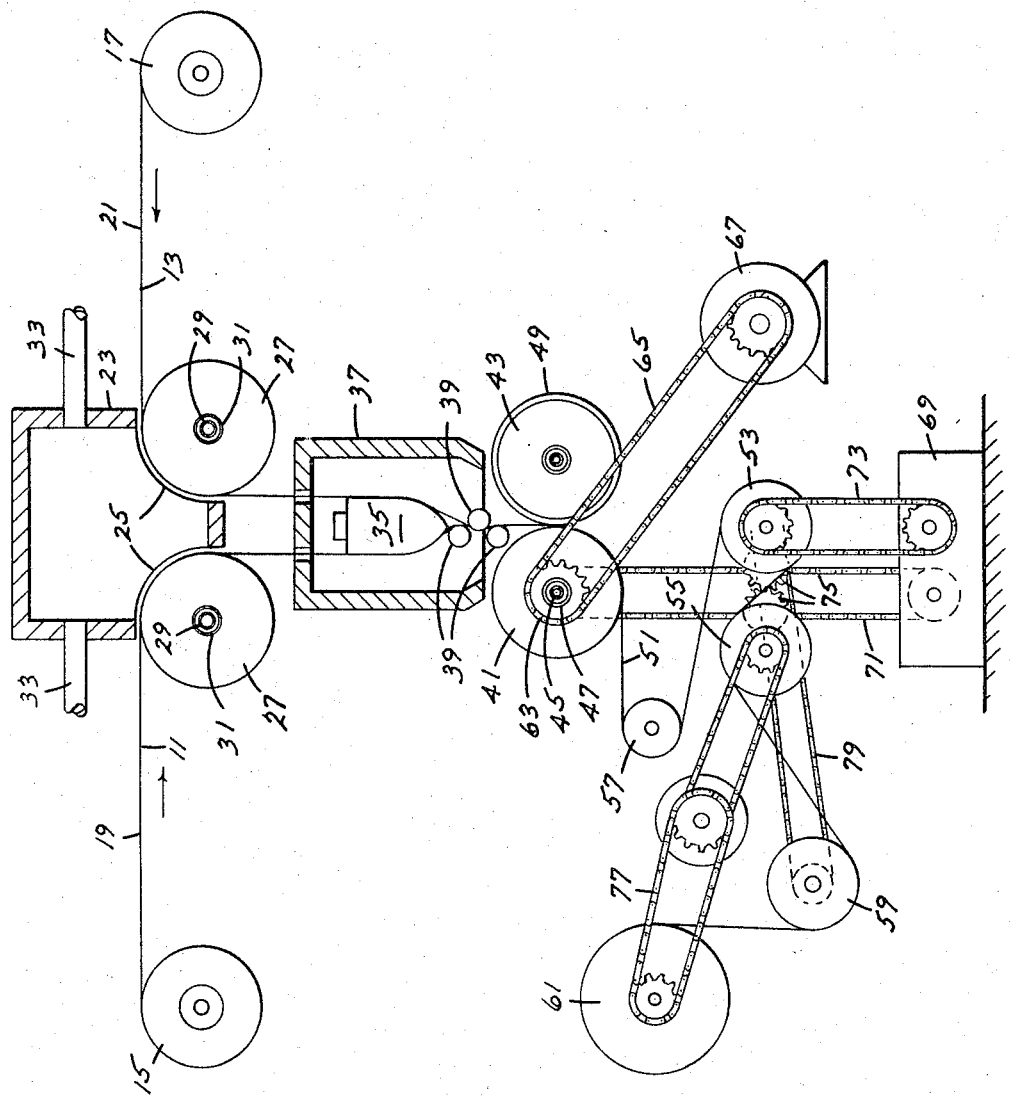

3,365,348
FILM LAMINATING METHOD
John D. Conti, Elkins Park, Pa., assignor to FMC Corporation, Philadelphia, Pa., a corporation of Delaware
Filed Nov. 1, 1963, Ser. No. 320,655
6 Claims. (Cl. 156—308)

ABSTRACT OF THE DISCLOSURE

A method in which a layer of moisture is condensed upon at least one side of the opposing sides of nonfibrous hydrophilic cellulosic sheet materials after which the sheet materials are heated to soften a coating of thermoplastic material thereon and to convert the moisture to steam. While in a heated condition, the sheet materials are pressed together to provide a composite product.

---

This invention relates to the production of composite articles, and more particularly to an improved method for laminating water-insoluble hydrophilic sheet materials.

In accordance with conventional procedures, hydrophilic sheet materials which are to be laminated are coated on at least one of the opposing sides thereof with a thermoplastic material and then combined, generally by being passed between pressure rollers. The sheet materials may be coated, for example, by known solvent coating or melt extrusion procedures and may be combined before or after the applied thermoplastic material has set. In the latter instance the pressure rollers are heated to again render the applied coating tacky as the sheet materials are pressed therebetween.

A significant disadvantage of these known procedures is that the heat applied to the hydrophilic sheet materials during the coating and/or laminating operations causes considerable moisture to escape from the sheet materials. Humidification of the resulting laminated product may, of course, render it suitable for its intended uses. However, such humidifying operations are generally slow and costly and are often unsatisfactory especially when appreciable quantities of moisture must be restored into the product. Accordingly, a primary object of this invention is to provide a generally new or improved and more satisfactory method for laminating hydrophilic sheet materials.

Another object of the invention is to provide an improved method for rapidly humidifying and laminating sheet materials.

Still another object of the invention is the provision of an improved method in which hydrophilic sheet materials are humidified and immediately thereafter bonded together under heat and pressure.

These objects are accomplished in accordance with the present invention by a method wherein a layer of moisture of predetermined thickness is condensed onto at least one of the opposing sides of each pair of water-insoluble hydrophilic sheet materials immediately after which the sheet materials are bonded together under heat and pressure. The sheet materials are provided with a coating of thermoplastic material on at least one side of each pair of opposing sides thereof, such coating being adapted to be heated to a temperature of at least 212° F. without undergoing substantial flow.

The condensed moisture is provided on the desired side of a sheet material by exposing such side to a hot, moist gaseous atmosphere or moist steam while concomitantly cooling the opposite side of the sheet material as by streams of cool air or chill rolls. One particular advantage of this invention is that the amount or thickness of the layer of moisture which is condensed onto a side of the sheet material can be varied and accurately controlled by regulating such factors as the amount and temperature of the hot, moist gaseous atmosphere to which the sheet material is exposed, the period of exposure, the rate and degree to which the sheet material is cooled, etc.

Immediately prior to the actual bonding operation, the sheet materials are heated to soften the coating of thermoplastic material carried thereon and to vaporize the one or more layers of condensed moisture. The expansion which is occasioned by the vaporizing moisture assists in forcing the same into the opposite sides of the sheet material so that humidification thereof is effected quite rapidly. Heating of the sheet materials may be achieved by any suitable means, as for example by engaging or passing the same close to a heated shoe or heat radiating bar, as described in my pending applications Ser. No. 246,932, filed Dec. 26, 1962 and Ser. No. 306,525, filed Sept. 4, 1963, now abandoned.

The sheet materials are pressed together while they are still in a heated condition and are maintained heated to a temperature of at least 212° F. but not greater than that to which they were originally heated. Under these conditions, the entrapment of droplets of condensed steam is avoided and there is little or no danger of damage to or possible flow of the thermoplastic coating as the sheet materials are pressed or laminated together. The composite or laminated product which is produced by bonding and heated and humidified sheet materials together is immediately cooled to room temperature to avoid the loss of moisture and is then collected.

Humidifying the sheet materials while they are in a heated condition permits the same to rapidly assume and retain relatively large quantities of moisture. Moreover, pressing or laminating of the heated sheet materials immediately after the humidification thereof is especially important since this procedure minimizes the loss of moisture from the sheet materials and provides for a composite product which contains far more moisture than could be imparted thereto by conventional procedures. Additionally, the equally important, when solvent coated sheet materials are laminated in accordance with the present invention, all residual traces of solvents are removed so that the resulting composite product is well adapted for use with food products and exhibits good performance on packaging and heat-sealing equipment.

The laminating method of the present invention is not limited to any particular water-insoluble hydrophilic sheet materials. The sheet materials may be coated with any suitable thermoplastic material which exhibits no flow when heated to about 212° F. One or both of the opposing sides of the sheet materials which are to be laminated may be provided with a coating of thermoplastic material and, if desired, the sheet materials may be each coated on their opposite sides with the same or different thermoplastic materials. The hydrophilic sheet materials which are to be laminated may be in the form of individual sheets, or continuous films, webs, bands, ribbons and the like.

For the sake of clarity and simplicity, the method of the present invention is hereafter described as applied to laminating a pair of continuous transparent films formed from viscose, which is commonly known as cellophane, and which are provided with a vinyl coating on at least each of the opposing sides thereof. More specifically, the thermoplastic coating material is selected from the group consisting of polyolefins having molecular weights of from 10,000 to 100,000 and densities in g./cc. of from 0.88 to 0.97 and interpolymers containing 50 to 95% by weight of vinylidene chloride, as more fully described in United States Patent 3,037,868. The thermoplastic material may be applied onto the regenerated cellulose films by melt extrusion procedures, which is preferred in the case of polyolefin coatings, or from a lacquer or emulsion, as is preferred when vinylidene chloride interpolymers are employed. In view of the rapid and extensive humidification which is effected during the method of the present invention, humidification of the individual regenerated cellulose films to restore moisture which had been lost during the coating operation is neither necessary nor particularly desired.

The single feature of the drawing diagrammatically illustrates the apparatus employed in the method of the present invention.

Referring now to the drawing, transparent regenerated cellulose films 11 and 13 which are to be laminated are supplied as rolls 15 and 17, respectively, and include a thermoplastic coating material on each of the opposing sides thereof, as indicated at 19 and 21.

The apparatus which is employed for laminating the films 11 and 13 includes a chamber 23 having discharge openings 25 which are partially closed by rolls 27. The rolls 27 are driven by suitable means, not shown, and are cooled to a desired temperature as by circulating chilled water or other fluids into or through the interior thereof by telescoped conduits 29 and 31.

A hot, moist atmosphere or moist steam is delivered into the chamber 23 by conduits 33 and is condensed as continuous layers of moisture onto the opposing sides of the films as they are carried past the chamber openings 25 by the chill roll 27. As heretofore mentioned, the thickness of the layers of condensed moisture may be varied and accurately controlled by regulating such factors as the amount and temperature of the moist steam to which the films are exposed, the period of exposure, the rate and degree to which the films are cooled, etc.

Upon leaving the chill rolls 27, the films 11 and 13 are advanced into engagement with an electrically heated shoe or radiating bar 35 which serves to soften the coated sides 19 and 21 and vaporize the layers of the condensed moisture which are carried thereon. Since this vaporizing and expanding moisture is generally confined between the films 11 and 13 it is rapidly forced into and is readily accepted by the same. Preferably an insulated hood 37 shields the heated shoes 35 and the vaporized moisture from undesired and premature cooling.

The temperature of the heated shoe 35 will, of course, vary with such factors as the nature of the films being laminated, the particular thermoplastic coating materials, the speed of the films, etc. In general the shoe 35 is heated to well within the softening range of the thermoplastic material forming the film coatings so as to assure that such coatings are maintained in a softened condition until the films are fully overlapped. It will be understood, of course, that the films 11 and 13 may be heated by other means, as for example by hot air or by being advanced relative to but in spaced relationship with a heat-radiating bar as described in my above-noted application Ser. No. 306,525.

The heated films 11 and 13 are, preferably, overlapped lightly by a series of spaced rollers 39 and are then passed between a pair of cooperating temperature and pressure rollers 41 and 43 to snugly join the tacky surfaces thereof. The rollers 39 are not intended to apply any substantial pressure to the films 11 and 13, but serve primarily to overlap the films without trapping air therebetween and before the tacky surfaces thereof are cooled. As illustrated, the heat insulated hood 37 preferably extends to such position as to at least partially protect the rollers 39 from undesired cooling.

The temperature roller 41 is of known steel construction and is maintained heated by a hot fluid circulated through the interior thereof by telescoped conduits 45 and 47. Preferably the roller 41 is heated to at least 212° F. but not greater than the softening temperature range of the thermoplastic material forming the film coating. When kept at such temperature, condensation of the moist steam on the roller surface is prevented and proper bonding of the coating of the films is assured. The cooperating pressure roller 43 is also of conventional construction and includes an outer covering 49 of silicone rubber or other heat-resistant resilient material.

The laminated product 51 which issues from between the rollers 41 and 43 is rapidly cooled by chill rolls 53 and 55. As illustrated, the laminated product 51 is wrapped about a substantial portion of the chill roll 53 by an idler roll 57 to provide for rapid and extensive cooling thereof. The chill rolls 53 and 55 are of conventional steel construction through which water or other chilled liquids can be circulated. Upon leaving the chill roll 55 the laminated product is passed about a rubber covered gripping or pull roll 59 and is then collected in roll form, as shown at 61.

To facilitate continuous advancement of the films 11 and 13 through the apparatus, as described above, a sprocket 63 is fixed to one end of the temperature rollers 41 and is driven by a chain 65 directly from a motor 67. A speed controller 69 is driven from the roller 41 by a chain 71 and in turn serves to drive the chill roll 53 by means of a chain 73. A train of gears 75 serves to transmit rotary motion from the roll 53 to the roll 55, the latter of which serves to drive the take-up roll 61 through a chain 77. By means of a chain 79 the chill roll 53 serves also to drive the rubber covered pull roll 59.

The following example is provided to further illustrate the method of the present invention.

Conventional transparent regenerated cellulose films, each being coated on one side with a copolymer of vinylidene chloride and vinyl chloride (Saran), were together laced through the described laminating apparatus, in the manner as illustrated, and with their coated sides in opposing relationship. The apparatus was then set in operation and the speed of the different drive members was gradually increased until the films were traveling at approximately 600 feet per minute. During this period, the temperature of the electrically heated shoe 35 was elevated to about 375° F., while refrigerated water was circulated through the chill rolls 27 to bring the peripheral surfaces thereof to a temperature of about 60° F. As these temperature conditions were approached moist steam was delivered into the chamber 23 under a pressure of about 10 pounds per square inch.

As the films were carried past the chamber openings 25, a layer of moisture was condensed onto each of the opposing sides thereof and traveled with the respective films as they moved toward and into engagement with the heated shoe 35. This shoe rapidly softened the coated sides of the film and concomitantly caused the layers of condensed moisture to vaporize and penetrate therein through the opposing surfaces thereof.

Upon leaving the shoe 35, the tacky or softened sides of the films were lightly pressed together by the rollers 39 and then snugly laminated to each other as they passed between the temperature and pressure rollers 41 and 43. The resulting laminated product was rapidly cooled by rolls 53 and 55 which were kept at a temperature of about 60° F. by circulating refrigerated water therethrough.

The laminated product exhibited a strong and continuous bond between the films, with no apparent haze or loss of film clarity. Striations which existed along the coated sides of the individual films appeared to disappear during the softening of such coated sides and were no longer visible in the laminated product. The moisture content of the laminated product was about 6.0% by weight. Further, it was found that the product having moisture contents as high as 11% could be produced by causing thicker layers of moisture to condense on the opposing sides of the films and, of course, by using slower speeds and correspondingly lower temperatures during the actual laminating operation. Equally important, it was noted that all traces of solvents were removed from the film during the humidifying and laminating operations so that the resulting laminated product was well suited for all uses.

It is to be understood that changes and variations may be made without departing from the spirit and scope of the invention as defined in the appended claims.

I claim:

1. A method of making a composite product from a plurality of nonfibrous hydrophilic cellulosic sheet materials having a coating of thermoplastic material on at least one side of each pair of opposing sides thereof including the steps of condensing a thin layer of moisture onto at least one of the opposing sides of each pair of opposing sides of the sheet materials, heating the moistened sheet materials to vaporize the layer of condensed moisture, thereby humidifying the sheet materials, and to elevate the temperature thereof to within the softening range of the thermoplastic material, and bonding the humidified sheet materials together while they are still in a heated condition to provide a composite product.

2. A method of making a composite product from a plurality of nonfibrous hydrophilic cellulosic sheet materials having a coating of thermoplastic material on at least one side of each pair of opposing sides thereof including the steps of subjecting at least one of the opposing sides of each pair of opposing sides of the sheet materials to a hot, moist atmosphere, maintaining the opposite side of such sheet material in a cool condition to cause a thin layer of moisture to condense onto the one side thereof, heating at least the moistened side of each pair of opposing sides of the sheet materials to elevate the temperature thereof to within the softening range of the thermoplastic material and to vaporize the layer of condensed moisture, thereby humidifying the sheet materials, laminating the heated and humidified sheet materials under pressure to provide a composite product, and thereafter cooling the composite product.

3. A method of making a composite product from a plurality of nonfibrous hydrophilic cellulosic sheet materials having a coating of thermoplastic material on at least one side of each pair of opposing sides thereof including the steps of subjecting at least one of the opposing sides of each pair of opposing sides of the sheet materials to a hot, moist gaseous atmosphere, concomitantly cooling the opposite side of such sheet material to condense a layer of moisture of predetermined thickness onto the one side thereof, heating the opposing sides of each pair of opposing sides of the sheet materials to elevate the temperature thereof to within the softening range of the thermoplastic material and to vaporize the layer of condensed moisture, thereby humidifying the sheet materials, engaging the heated sides of the humidified sheet materials and pressing the same together to provide a composite product, maintaining the engaged sheets heated during the pressing thereof to a temperature not greater than the temperature to which they were originally heated, and cooling the composite product.

4. A method as defined in claim 3 wherein a layer of moisture is condensed onto both of the opposing sides of each pair of opposing sides of the sheet materials.

5. A method of laminating a pair of continuous films formed of nonfibrous hydrophilic cellulosic materials and having a coating of thermoplastic material on at least one side of each pair of opposing sides thereof including the steps of continuously advancing the films in spaced apart relationship while subjecting the opposing sides thereof to a hot, moist gaseous atmosphere, concomitantly cooling the opposite sides of the respective sheet materials to cause a layer of moisture to condense onto each of the opposing sides thereof, heating the opposing sides of the films as they are advanced away from the moist gaseous atmosphere to elevate the temperature thereof to within the softening temperature range of the thermoplastic material and to vaporize the layers of condensed moisture, thereby humidifying the films, pressing the humidified heated sides of the films together while continuously advancing the same to provide a composite product and cooling the composite product.

6. A method as defined in claim 5 wherein said coating comprises materials from the group consisting of polyolefins having molecular weights of from 10,000 to 100,000 and densities in g./cc. of 0.88 to 0.97 and interpolymers containing 50 to 95% by weight of vinylidene chloride.

References Cited
UNITED STATES PATENTS

| | | | |
|---|---|---|---|
| 1,703,961 | 3/1929 | Schmidt et al. | |
| 2,224,370 | 12/1940 | Wescott | 156—322 |
| 2,370,811 | 3/1945 | Osgood | 34—37 |
| 2,718,065 | 9/1955 | Conti | 34—156 X |
| 3,037,868 | 6/1962 | Rosser | 161—249 X |

EARL M. BERGERT, *Primary Examiner.*

CLIFTON B. COSBY, *Examiner.*